United States Patent
Tsukamoto

(10) Patent No.: US 7,580,059 B2
(45) Date of Patent: Aug. 25, 2009

(54) IMAGE PICKUP APPARATUS WITH CONTROL OF EXTERNAL IMAGE SCANNER

(75) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 11/238,857

(22) Filed: Sep. 29, 2005

(65) Prior Publication Data

US 2006/0066733 A1    Mar. 30, 2006

(30) Foreign Application Priority Data

Sep. 29, 2004  (JP) .............................. 2004-284782

(51) Int. Cl.
*H04N 5/232* (2006.01)
*H04N 5/225* (2006.01)
*H04N 5/76* (2006.01)

(52) U.S. Cl. .............................. 348/211.99; 348/207.2; 348/207.1; 348/211.4; 348/211.5; 348/211.6; 348/231.3

(58) Field of Classification Search ................ 348/206, 348/207.99, 207.1, 207.11, 207.2, 211.99, 348/211.1, 211.2, 211.3, 211.4, 211.5, 211.6, 348/211.7, 211.14, 231.99, 231.1, 231.2, 348/231.3, 231.4, 231.5, 231.6, 231.7, 231.8, 348/231.9, 333.01, 333.02, 333.04, 333.05, 348/333.06, 333.07, 333.1, 333.11, 333.12

See application file for complete search history.

(56) References Cited

U.S. PATENT DOCUMENTS

| 6,188,431 | B1* | 2/2001 | Oie ......................... 348/211.5 |
| 6,504,626 | B1* | 1/2003 | Shih .......................... 358/442 |
| 7,106,375 | B2* | 9/2006 | Venturino et al. ....... 348/333.02 |
| 2002/0196477 | A1* | 12/2002 | Chen ......................... 358/474 |

\* cited by examiner

*Primary Examiner*—David L Ometz
*Assistant Examiner*—Peter Chon
(74) *Attorney, Agent, or Firm*—Cowan, Liebowitz & Latman, P.C.

(57) ABSTRACT

An imaging apparatus of the present invention includes an image pickup unit, a recording unit for recording image data obtained by the image pickup unit, on a recording medium, a communication unit for exchanging data with an external equipment, a setting unit for setting a parameter relating to an image pickup operation of the image pickup unit, a generation unit for generating setting information based on the parameter set by the setting unit and a control unit for controlling the communication unit to transmit a command for instructing a start of an image reading and the setting information to an image scanner provided externally so that image data corresponding to the setting information are transmitted from the image scanner.

4 Claims, 3 Drawing Sheets

IMAGE PICKUP APPARATUS WITH CONTROL OF EXTERNAL IMAGE SCANNER

BACKGROUND OF THE INVENTION

1. Field of the Invention

The present invention relates to an image pickup apparatus, and more particularly to such apparatus capable of receiving image data by controlling an external equipment.

2. Related Background Art

There are already known a digital camera and a digital video camera, capable of picking up an image and recording it as digital data. Such digital camera is usually provided with a digital interface such as USB, and, by a connection with an external computer through such digital I/F, is capable of transmitting the picked-up image data to the computer.

There is also conceived a system in which a digital camera and a printer are connected by a digital I/F and the picked-up image data are transmitted to the printer for enabling a printing (for example cf. Japanese Patent Application Laid-Open No. 2002-354382).

There is also proposed a system in which an image scanner and a computer are connected and a start of a reading operation is instructed from the computer to the scanner to read still image data by the scanner, and the read image data are transmitted to the computer (for example cf. Japanese Patent Application Laid-Open No. H11-53512).

There is further conceived a configuration for a digital camera, in which the digital camera is set at an ordinary camera mode when it is not connected with a computer, and is set at a scanner mode when it is connected with a computer but is not equipped with a hard disk (for example cf. Japanese Patent Application Laid-Open No. H08-191410).

However, in case of utilizing a digital camera or a digital video camera as an image scanner as described in Japanese Patent Application Laid-Open No. H08-191410, there may be encountered drawbacks such as a difficulty in the method of fixing the camera or a deficiency of illuminating light amount for the image pickup object.

More specifically, in case it is required to fix an object exactly in the horizontal/vertical direction or to secure a sufficient light amount for the object, an image of the object can be more effectively picked up by an image scanner rather than a digital camera or a digital video camera.

On the other hand, in case of recording a still image picked up by an image scanner onto a recording medium such as a memory card provided on a digital camera or a digital video camera, it has been necessary to connect the scanner with an external computer, then to fetch a still image, picked up by the scanner by controlling the scanner from such external computer, into the computer and to transfer the image from the external computer to a recording medium of the digital camera or the digital video camera, and troublesome procedures are therefore involved.

SUMMARY OF THE INVENTION

An object of the present invention is to solve the drawbacks as mentioned above.

Another object of the present invention is to provide an imaging apparatus capable of instructing a start of image data reading and the like to an image scanner connected thereto.

In order to attain aforementioned objects, according to an aspect of the present invention, an imaging apparatus of the present invention comprises image pickup means, recording means which records image data, obtained by the image pickup means, on a recording medium, communication means which exchanges data with a external equipment, setting means which sets a value of a parameter relating to an image pickup operation of the image pickup means, wherein the image pickup means generates image data according to the parameter value set by the setting means, generation means which generates setting information based on the parameter value set by the setting means, and control means which controls the communication means to transmit a command for instructing a start of an image reading and the aforementioned setting information to an image scanner provided externally so that image data corresponding to the setting information are transmitted from the image scanner provided externally.

Still other objects of the present invention, and features thereof, will become fully apparent from the following detailed description of embodiments of the invention, to be taken in conjunction with the accompanying drawings.

DESCRIPTION OF THE PREFERRED EMBODIMENTS

In the following, a preferred embodiment of the present invention will be explained with reference to the accompanying drawings.

Figure 1:
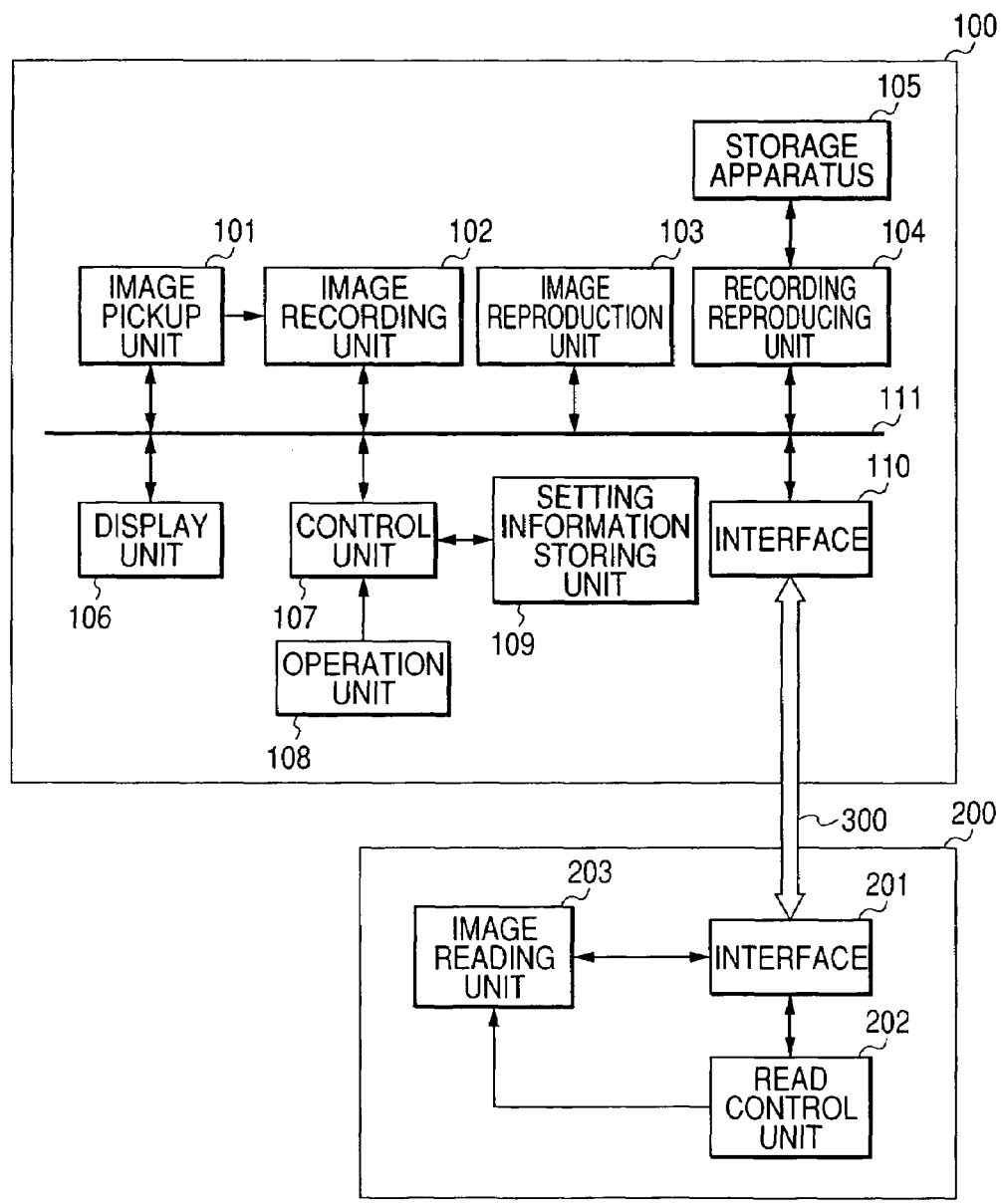
FIG. 1 is a view showing a configuration of a digital camera and an image scanner in an embodiment of the present invention.

FIG. 1 is a schematic view showing a configuration of a digital camera 100 and an image scanner 200 in an embodiment of the present invention. In the present embodiment, as shown in FIG. 1, the digital camera 100 and the image scanner 200 are connected to a transmission path 300. Between the interfaces of the digital camera 100 and the image scanner 200, there may be provided a device for relaying interfaces, such as a hub.

In the digital camera 100, an image pickup unit 101 includes an optical system such as a lens, a CCD for reading an object image two-dimensionally to convert it into an electrical signal, and an A/D converter for converting the analog electrical signal into digital data, and outputs digital image data. An image recording unit 102 converts a size of the image from the image pickup unit 101 into a set size (pixel number), encodes converted the image data by a JPEG method and outputs the encoded image data. In the present embodiment, an operation unit 108 can be operated to arbitrarily set a size (pixel number) and a compression rate (image quality) of the image data to be recorded, and thus set information is stored, by the control unit 107, in a set information storage unit 109. The control unit 107 controls the image recording unit 102 in such a manner that the encoding is executed according to information of an image size and a compression rate stored in the setting information storage unit 109.

The image recording unit 102 also executes, as will be explained later, an encoding process on image data entered through an interface 110.

An image reproduction unit 103 decodes the image data reproduced from a storage apparatus 105 and supply the decoded image data to a display unit 106. A recording/reproduction unit 104 executes recording or reproducting compression encoded image data into or from the storage apparatus 105. The storage apparatus 105 is constituted of a recording medium such as a memory card, for recording compression encoded image data.

A display unit 106 is formed by a display apparatus such as a liquid crystal display, and displays an image corresponding to image data obtained from the image pickup unit 101, those decoded by the image reproduction unit 103, or those entered from the interface 110. The display unit 106 allows the user to confirm an image picked up by the image pickup unit 101, or an image received from the interface 110. The display unit 106 also displayed another image such as a menu image or the like. The image data size and the compression rate mentioned above can be set utilizing such displayed menu image.

The control unit 107 controls various units of the digital camera 100, according to an instruction from the operation unit 108. The operation unit 108 is equipped with various operation buttons, such as a power switch, a shutter button, a menu button and a four-way operational key. The setting information storage unit 109 stores the size information and the image quality information of the recorded image data, set by the operation unit 108. 110 denotes a digital interface.

The interface 110 is a general interface for connecting a computer and a peripheral equipment, such as USB, IEEE1394 or a wireless communication such as BlueTooth. The digital camera 100 executes an exchange of control information such as command/response, and a reception of image data, with a connected device (image scanner 200 in the present embodiment) by the interface 110 and through the transmission path 300.

In the present embodiment, the interface 110 allows to connect a PC (personal computer) and a digital camera 100, and the present embodiment has a function, by connecting the digital camera 100 and the image scanner 200, of controlling the image scanner 200 to receive image data.

The digital camera 100 of the present embodiment is arranged to be in an image reading mode during a connection with the image scanner 200, and, in response to a depression of the shutter button, transmits a command for instructing a start of a scanning operation to the image scanner 200.

On the other hand, the image scanner 200 is equipped with an interface 201 capable of communicating, in the same communication method, with the interface 110 of the digital camera 100. The image scanner 200 executes an exchange of control information having a parameter such as command/response or a transmission of digital image data not compressed yet, with the connected device (digital camera 100 in the present embodiment) through the interface 201.

A reading control unit 202 controls the operation of an image reading unit 203 according to a command received by the interface 201, and transmits, to the digital camera 100, image data read by the image reading unit 203 and response information. An image reading unit 203 includes a CCD for reading an object image in a one-dimensional direction to convert it into an electrical signal, an A/D converter for sampling the analog electrical signal thereby converting it into digital data, and a memory for temporarily storing the read digital data.

In such configuration, there will at first be explained operations of the digital camera 100 in a state where the digital camera 100 is not connected with the image scanner 200.

At first there will be explained an ordinary image pickup operation.

When a power supply is turned on by the operation unit 108, an image obtained by the image pickup unit 101 is displayed on the display unit 106. The user operates the shutter button of the operation unit 108, while confirming an object image displayed on the display unit 106. In response to the operation of the shutter button, the control unit 109 transmits the image size and the image quality information, stored in the setting information storage unit 109, to the image recording unit 102. The image recording unit 102 changes the size of the image data from the image pickup unit 101 according to the set image size, then encodes the image data according to the image quality information, and sends the image data to the recording/reproduction unit 104. The recording/reproduction unit 104 stores the encoded image data in the storage apparatus 105.

At a reproduction, in response to an instruction for reproducing a designated image from the operation unit 108, the control unit 107 controls the recording/reproduction unit 104 to read the designated image data from the storage apparatus 105. Then the read image data are decoded by the image reproduction unit 103 and are displayed on the display unit 106.

In the following there will be explained an operation in a state where the digital camera 100 is connected with the image scanner 200.

When the interface 110 of the digital camera 100 is connected with the interface 201 of the image scanner 200, the control unit 107 of the digital camera 100 sets the digital camera 100 in an image reading mode, and displays, on the display unit 106, information indicating an image reading mode.

When the shutter button of the operation unit 108 is operated in this state, the control unit 107 controls the interface 110 to transmit a command for instructing a start of a reading operation to the connected device (image scanner 200 in the present embodiment). Also image size information, stored in the setting information storage unit 109, is transmitted as a parameter for the reading operation. In addition to the image size information, there may be transmitted parameters relating to the image processing performed during the image pickup operation in the digital camera 100.

In the image scanner 200, the reading control unit 202 controls the image reading unit 203 based on the command and the setting information received by the interface 201. The image reading unit 203 reads, based on the image size instructed by the reading control unit 202, an original (original image) fixed on an unillustrated original table of the image scanner 200. Then the read image data are converted by an A/D converter into digital image data, and the uncompressed digital image data of one frame are stored in a memory. Then the digital image data of one frame, thus stored in the memory, are transmitted to a connected device (digital camera 100 in the present embodiment) through the interface 201.

Figure 2A:
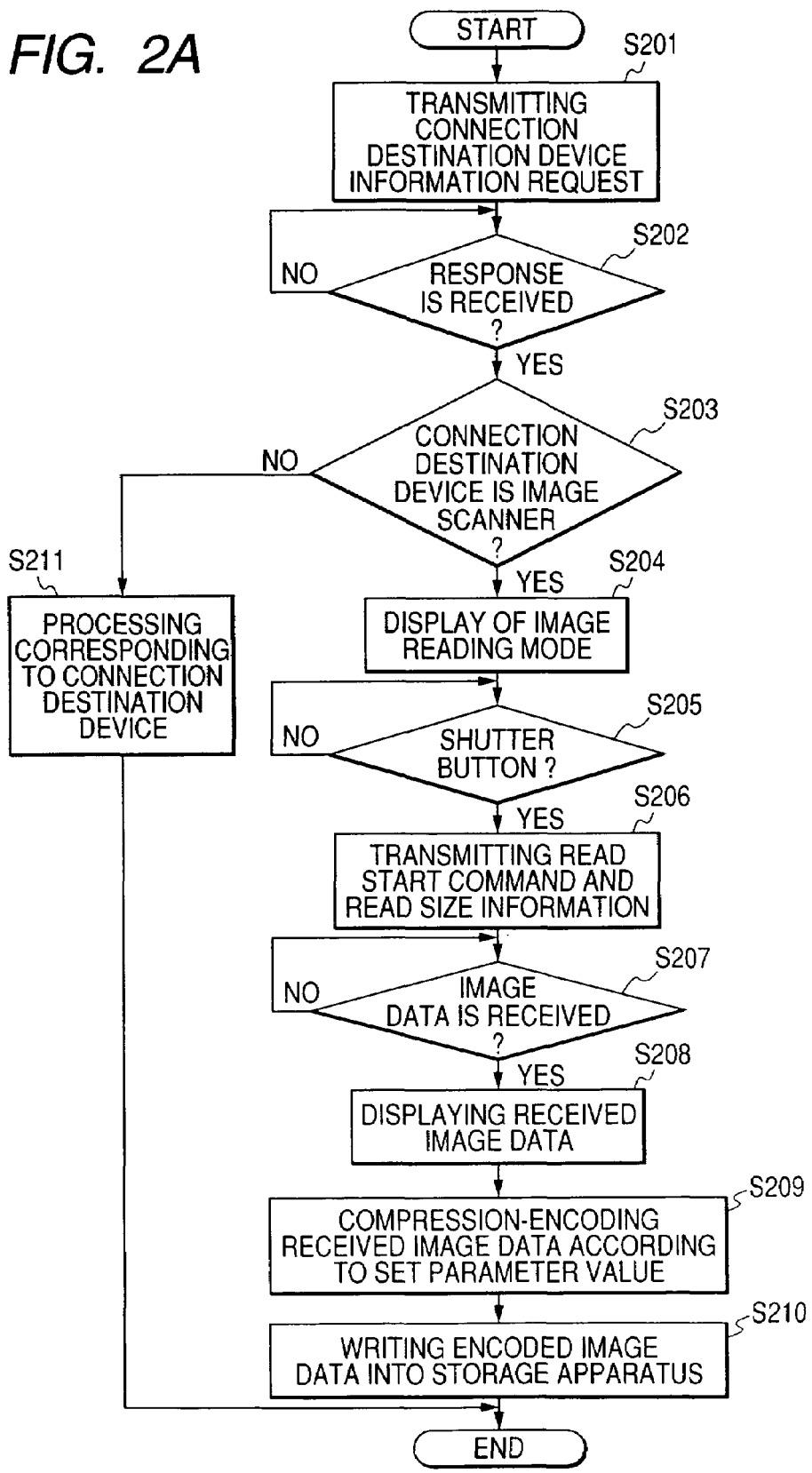
FIGS. 2A and 2B are flow charts showing operations of a digital camera and an image scanner in an embodiment of the present invention.
Figure 2B:
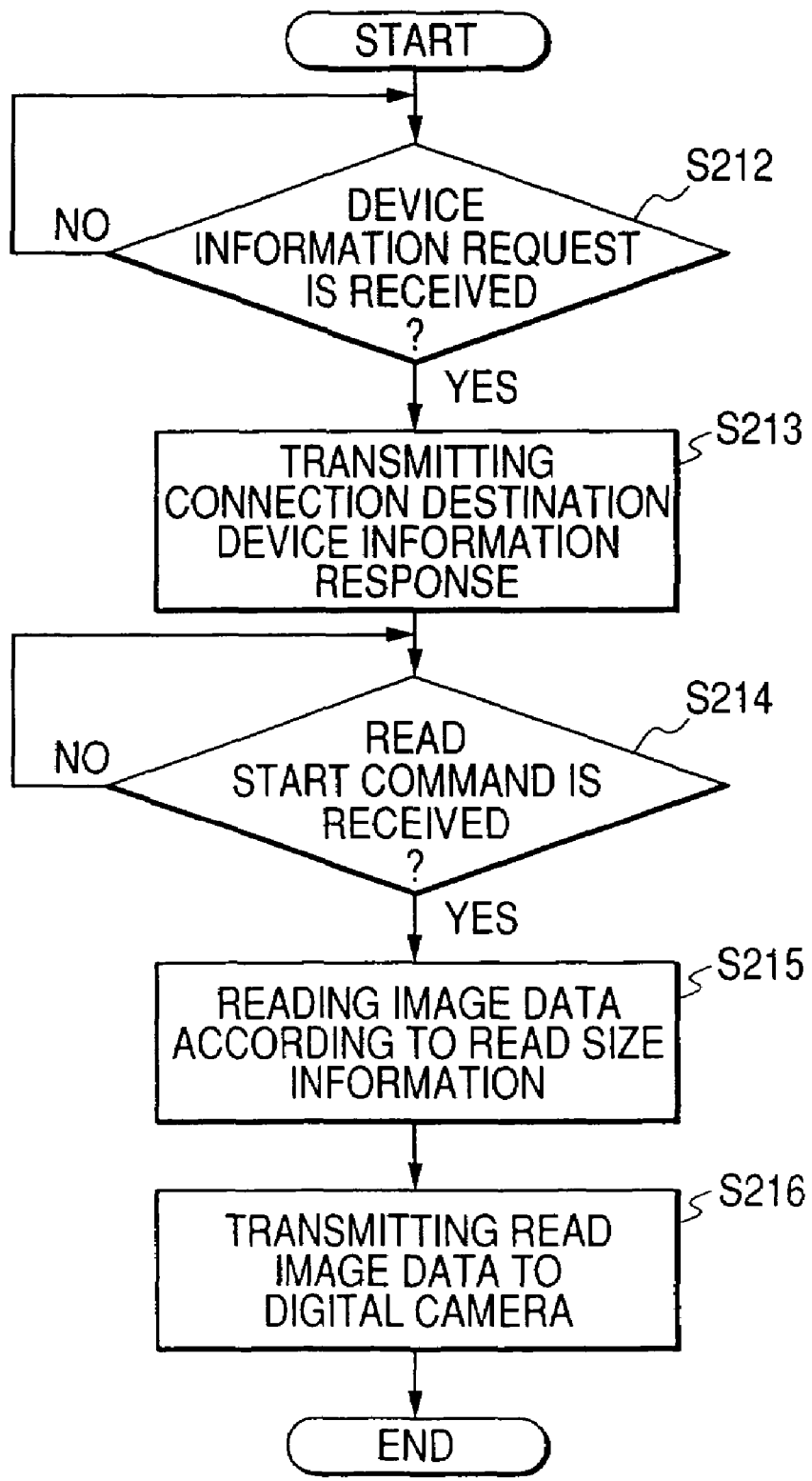

FIGS. 2A and 2B are flow charts showing a process of image reading, recording and display performed by controlling the image scanner by the digital camera 100 shown in FIG. 1. FIG. 2A shows operations of the digital camera 100 while FIG. 2B shows operations of the image scanner 200. The flow is initiated when the digital camera 100 and the image scanner 200 are connected by an interface cable 300 as shown in FIG. 1.

At first, as shown in FIG. 2A, the control unit 107 of the digital camera 100 transmits a request command, inquiring device information of the connected device, to the image scanner 200 through the interface 110 (step S201).

In the image scanner 200, as shown in FIG. 2B, the interface 201, upon receiving the request command (step S212), transfers it to the reading control unit 202. The reading control unit 202 returns its device information as a response to the digital camera 100 through the interface 201 (step S213).

In the digital camera 100, the interface 110, upon receiving the response (step S202), transfers it to the control unit 107. The control unit 107 discriminates whether the connected device is an image scanner 200 (step S203). In case that the connected device is confirmed as the image scanner 200 (YES in a step S203), the digital camera 100 shifts to an image reading mode, and displays, on the display unit 106, information indicating such state (step S204). On the other hand, in case the connected device is not the image scanner 200 (NO in the step S203), there is executed a process corresponding to the connected device (step S211).

In case the digital camera 100 is in the image reading mode, a start of a reading operation for a fixed image can be instructed to the image scanner 200 by operating the shutter button of the operation unit 108.

When the shutter button is operated, the operation unit 108 informs the control unit 107 of such operation (step S205). In response, the control unit 107 transmits an image reading start command, together with the image size information stored in the setting information storage unit 109, to the image scanner 200 through the interface 110 (step S206).

The interface 201 of the image scanner 200, upon receiving the image reading start command, transfers it to the reading control unit 202 (step S214). The reading control unit 202 instructs the image reading unit 203 to start an image reading according to the image size information transmitted together with the image reading start command.

In response to the instruction by the reading control unit, the image reading unit 203 reads an image of an original, set on the original table of the image scanner 200, with resolution corresponding to the set image size (S215). Then the image reading unit 203 temporarily stores, in a memory, the read digital image data not compressed yet. Upon completion of the image reading by the image reading unit 203 and of the data storage in the memory, the reading control unit 202 transmits the image data to the digital camera 100 through the interface 201 (step S216).

The digital camera 100 receives thus transmitted digital image data not compressed yet (step S207). The interface 110 displays the received digital image data on the display unit 106 (step S208) and transfers the data to the image recording unit 102.

The image recording unit 102 encodes the transferred digital image data according to a compression rate set by the setting information stored in the setting information storage unit 109, and sends the image data to the recording/reproduction unit 104 (step S209). Thereafter the recording/reproduction unit 104 stores the encoded data in the storage apparatus (step S210).

In the present embodiment, as explained in the foregoing, a start of an image data reading can be instructed to the image scanner 200 by operating the shutter button of the digital camera 100 in a state where the digital camera 100 and the image scanner 200 are connected (in an image reading mode state of the digital camera 100).

Then the image data read according to the instruction,.are received from the image scanner 200, and thereby the received digital image data not compressed yet can be compression-encoded with a set compression rate for recording and displayed as an image for confirmation.

In the present embodiment, it is also possible to instruct the image scanner 200 to scan and send back image data of an image size set as the size of the image taken by the image pickup unit 101.

Also the digital camera 100 of the present embodiment, being capable of recording the image data received from the image scanner 200 through the interface 110, by performing a compression-encoding process of a compression rate set when recording the image data taken by the image pickup unit 101, can execute a processing with an optimum compression rate for the image size of the image data outputted by the image scanner 200.

In the foregoing embodiment, a recorded image size and a compression rate are taken as examples of parameters to be set by the user. It is also possible, for example, to also provide image data compression means other than the JPEG process and to cause the user to select the compression process arbitrarily.

Also the digital camera 100 is not limited to the configuration explained above, and there can be adopted, for example, a configuration in which a program for realizing the functions of various processes shown in FIG. 2A is read by the control unit 107 and is executed by a CPU (central processing unit). In such case, the digital camera 100 is equipped with a CPU and a memory usable by the CPU. The memory means a computer-readable memory medium such as a ROM.

Also such memory is not restricted to a ROM but can constituted of a non-volatile memory such as an HDD, a magnetooptical disk apparatus, or a flash memory, a read-only memory such as a CD-ROM, a volatile memory other than a RAM, or a recording medium that can be read and written by a computer, formed by a combination thereof.

The present invention has been explained by an embodiment with reference to the accompanying drawings, but the specific configuration is not limited to such embodiment, but includes also designs within the scope of the present invention.

This application claims priority from Japanese Patent Application No. 2004-284782 filed on Sep. 29, 2004, which is hereby incorporated by reference herein.

What is claimed is:

1. An imaging apparatus comprising:

image pickup means for imaging an object and for generating image data;

recording means which records image data generated by said image pickup means, in a recording medium;

communication means for communicating with external equipments including an image scanner;

mode changing means for changing a mode of the imaging apparatus between an image pickup mode in which said image pickup means generates the image data and said recording means records the image data in said recording medium and a communication mode in which said communication means communicates with said image scanner and receives image data transmitted by said image scanner and said recording means records the received image data in the recording medium;

setting means which sets an image size of the image data to be generated by said image-pickup means in the image pickup mode and stores an image size information indicating the set image size in a storage unit;

an instruction button which instructs an image pickup operation by said image pickup means in the image pickup mode and instructs a start of an image reading operation by said image scanner in the communication mode; and control means which controls said image pickup means, in the image pickup mode, in accordance with the image size information stored in the storage unit, said imaging means to generate the image data of the image size indicated by the image size information stored in the storage unit in response to the instruction from said instruction button, and controls said communication means, in the communication mode, to transmit a command for instructing the start of an image reading operation and the image size information stored in the storage unit to said image scanner in response to the instruction from said instruction button so that image data of the image size indicated by the image size information are transmitted from said image scanner and received by said communication means.

2. An apparatus according to claim 1, wherein the recording means includes compression means which encodes image data thereby compressing an information amount of the image data, said setting means setting a compression rate of the compression means, said compression means compressing the image data generated by said image pickup means according to the compression rate in the image pickup mode and compressing the image data received by said communication means according to the compression rate in the communication mode.

3. An apparatus according to claim 1, wherein, in the communication mode, the control means inhibits the image pickup by the image pickup means even when the instructing button is operated.

4. A system comprising of an imaging apparatus and an image scanner, wherein the imaging apparatus comprises:

image pickup means for imaging an object and for generating image data;

recording means which records image data generated by said image pickup means, in a recording medium;

communication means for communicating with external equipments including the image scanner;

mode changing means for changing a mode of the imaging apparatus between an image pickup mode in which said imaging means generates the image data and said recording means records the image data in said recording medium and a communication mode in which said communication means communicates with said image scanner and receives image data transmitted by said image scanner and said recording means records the received image data in the recording medium;

setting means which sets an image size of the image data to be generated by said image pickup means in the image pickup mode and stores an image size information indicating the set image size in a storage unit;

an instruction button which instructs an image pickup operation by said image pickup means in the image pickup mode and instructs a start of an image reading operation by said image scanner in the communication mode; and control means which controls said image pickup means, in the image pickup mode, in accordance with the image size information stored in the storage unit, said imaging means to generate the image data of the image size indicated by the image size information stored in the storage unit in response to the instruction from said instruction button, and controls said communication means, in the communication mode, to transmit a command for instructing the start of an image reading operation and the image size information stored in the storage unit to said image scanner in response to the instruction from said instruction button so that image data of the image size indicated by the image size information are transmitted from said image scanner and received by said communication means: and wherein the image scanner comprises:

an interface for communicating with the imaging apparatus;

reading means which generates image data by reading an object image; and reading control means which controls the reading means according to the reading start command and the image size information received by said interface so as to generate the image data of the image size indicated by the image size information, wherein the reading control means controls the interface thereby transmitting the image data of the image size indicated by the image size information obtained by the reading means, to the imaging apparatus.

* * * * *